(12) United States Patent
Gam

(10) Patent No.: US 6,607,646 B2
(45) Date of Patent: Aug. 19, 2003

(54) CATHODIC ELECTROCOATING COMPOSITIONS CONTAINING HYDROXYL-CARBONATE BLOCKED POLYISOCYANATE CROSSLINKING AGENT

(75) Inventor: Allisa Gam, Troy, MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 120 days.

(21) Appl. No.: 09/950,911

(22) Filed: Sep. 12, 2001

(65) Prior Publication Data

US 2003/0064227 A1 Apr. 3, 2003

(51) Int. Cl.⁷ .............................................. C25D 13/10
(52) U.S. Cl. ........................ 204/489; 204/504; 204/505; 523/415
(58) Field of Search ................................ 204/489, 504, 204/505; 523/415

(56) References Cited

U.S. PATENT DOCUMENTS

| | | |
|---|---|---|
| 4,615,779 A | 10/1986 | McCollum et al. |
| 5,264,497 A | 11/1993 | Honig et al. |
| 5,431,791 A | 7/1995 | December et al. |
| 5,527,614 A | 6/1996 | Carpenter et al. |
| 5,856,382 A | 1/1999 | Ohrbom et al. |
| 6,048,443 A | 4/2000 | December et al. |
| 6,093,299 A | 7/2000 | Blum et al. |
| 2002/0086966 A1 | 7/2002 | Weise et al. |

FOREIGN PATENT DOCUMENTS

| | | |
|---|---|---|
| DE | 19530226 C2 | 3/1999 |
| EP | 0350618 A2 | 1/1990 |
| EP | 0737726 A1 | 10/1996 |
| EP | 0661354 B1 | 8/1998 |
| JP | 07 331181 A | 12/1995 |
| JP | 2001 172277 A | 6/2001 |

OTHER PUBLICATIONS

Copy of International Search Report Dated Apr. 12, 2002.

*Primary Examiner*—Kishor Mayekar
(74) *Attorney, Agent, or Firm*—Steven C. Benjamin

(57) ABSTRACT

An improved aqueous cathodic electrocoating composition having a binder of an epoxy-amine adduct and a blocked polyisocyanate crosslinking agent; wherein the improvement is the use of a hydoxyl-carbonate blocked polyisocyanate crosslinking agent. Electrodeposited finishes are formed that have reduced weight loss when heated to cure.

10 Claims, No Drawings

CATHODIC ELECTROCOATING COMPOSITIONS CONTAINING HYDROXYL-CARBONATE BLOCKED POLYISOCYANATE CROSSLINKING AGENT

BACKGROUND OF THE INVENTION

This invention is directed to a cathodic electrocoating composition and in particular to a cathodic electrocoating composition containing a blocked polyisocyanate cross-linking agent which significantly reduces bake-off loss occurring from the coating film during cure.

The coating of electrically conductive substrates by an electrodeposition process, also called an electrocoating process, is a well known and important industrial process. Electrodeposition of primers to metal automotive substrates is widely used in the automotive industry. In this process, a conductive article, such as an autobody or an auto part, is immersed in a bath of a coating composition of an aqueous emulsion of film forming polymer and the article acts as an electrode in the electrodeposition process. An electric current is passed between the article and a counter-electrode in electrical contact with the coating composition, until a coating of a desired thickness is deposited on the article. In a cathodic electrocoating process, the article to be coated is the cathode and the counter-electrode is the anode.

Film forming resin compositions used in the bath of a typical cathodic electrodeposition process also are well known in the art. These resins typically are made from polyepoxide resins which have been chain extended and then an adduct is formed to include amine groups in the resin. Amine groups typically are introduced through a reaction of the resin with an amine compound. These resins are blended with a crosslinking agent usually a blocked polyisocyanate and then neutralized with an acid to form a water emulsion which is usually referred to as a principal emulsion.

The principal emulsion is combined with a pigment paste, coalescent solvents, water, and other additives such as a catalyst to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics of the tank, the immersion time, and the like.

The resulting coated article is removed from the bath and is rinsed with deionized water. The coating on the article is cured typically in an oven at sufficient temperature to form a crosslinked finish on the article. The presence of the catalyst enhances the crosslinking of the finish.

Cathodic electrocoating compositions, resin compositions, coating baths and cathodic electrodeposition processes are disclosed in Jarabek et al U.S. Pat. No. 3,922,253 issued Nov. 25, 1975; Wismer et al U.S. Pat. No. 4,419,467 issued Dec. 6, 1983; Belanger U.S. Pat. No. 4,137,140 issued Jan. 30, 1979 and Wismer et al U.S. Pat. No. 4,468,307 issued Aug. 25, 1984.

One disadvantage associated with conventional electrocoating compositions containing blocked isocyanate crosslinking agents is that they suffer elimination losses during baking, known as bake-off losses, principally due to volatilization of blocking agents. The standard blocking agents are typically high molecular weight alkyl alcohols or ether alcohols, which produce significant film weight losses during the baking process, which makes it necessary to purify the exhaust air discharged from the oven and constitutes an unwanted loss in resin solids. In addition, the volatile blocking agents released during cure can cause other deleterious effects on various coating properties, e.g., a rough surface. U.S. Pat. No. 4,615,779 to McCollum et al issued Oct. 7, 1986 shows the use of lower molecular weight alcohol blocking agents for the polyisocyanate to reduce weight loss when the film is heated to cure. Such blocking agents, however, can produce undesirable film defects. Therefore, there is still a need to find new blocked isocyanate cross-linking agents for cathodic electrocoating compositions that provide reduced bake-off loss, while maintaining the desired coating properties.

SUMMARY OF THE INVENTION

An improved aqueous cathodic electrocoating composition having a film forming binder of an epoxy-amine adduct, a blocked polyisocyanate crosslinking agent and an organic or inorganic acid as the neutralizing agent for the epoxy-amine adduct; wherein the improvement is the use of a blocked polyisocyanate crosslinking agent that has at least one isocyanate group blocked with a hydroxy-functional cyclic carbonate compound for reduced bake-off loss on cure.

DETAILED DESCRIPTION OF THE INVENTION

The electrocoating composition of this invention is an aqueous composition preferably having a solids content of about 5–50% by weight of a principal emulsion of a cathodic film forming binder, additives, pigment dispersant resins, pigments and the like and usually contains an organic coalescing solvent.

The film forming binder of the principal emulsion used to form the cathodic electrocoating composition of this invention is an epoxy-amine adduct and a novel blocked polyisocyanate crosslinking agent. The epoxy-amine adduct is usually formed from an epoxy resin which preferably is chain extended and then reacted with an amine to provide an adduct with amine groups that are subsequently neutralized with an acid. The epoxy-amine adduct usually is blended with the blocked polyisocyanate and then neutralized with an acid and inverted into water to form an aqueous emulsion, which is referred to as the principal emulsion. Other ingredients are then added to the principal emulsion such as pigment in the form of a pigment paste, coalescent solvents, anticrater agent, flexibilizers, defoamers, wetting agents and other additives such as catalyst to form a commercial electrocoating composition. Typical aqueous cathodic electrocoating compositions are shown in DebRoy et al U.S. Pat. No. 5,070,149 issued Dec. 3, 1991 and the aforementioned U.S. Pat. Nos. 3,922,253; 4,419,467; 4,137,140 and 4,468,307.

The advantage of the electrocoating composition of this invention formulated with the novel blocked polyisocyanate crosslinking agent is that there is reduced bake-off loss and attendant weight loss occurring from the film during cure after electrodeposition. In addition, the electrocoating composition exhibits lower curing temperature, better edge corrosion resistance and smoother appearance in comparison to electrocoating compositions that contain conventional alcohol blocked polyisocyanate crosslinking agents.

The epoxy-amine adduct of the novel composition is formed of an epoxy resin which preferably is chain extended and then reacted with an amine. The resulting epoxy-amine adduct has reactive hydroxyl, epoxy and amine groups.

The epoxy resin used in the epoxy amine adduct is a poly epoxy-hydroxy-ether resin having an epoxy equivalent weight of about 100–2,000.

Epoxy equivalent weight is the weight of resin in grams which contain one gram equivalent of epoxy.

These epoxy resins can be any epoxy-hydroxy containing polymer having a 1,2-epoxy equivalency of two or more per molecule, that is, a polyepoxide which has on an average basis two or more epoxy groups per molecule. The preferred are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis-(4-hydroxyphenyl)ethane, 2-methyl-1,1-bis-(4-hydroxyphenyl)propane, 2,2-bis-(4-hydroxy-3-tertiarybutylphenyl)propane, 1,1-bis-(4-hydroxyphenol)ethane, bis-(2-hydroxynaphthyl)methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols are alicyclic polyols, particularly cycloaliphatic polyols, such as 1,2-bis (hydroxymethyl)cyclohexane, 1,3-bis-(hydroxymethyl) cyclohexane, 1,2-cyclohexane diol, 1,4-cyclohexane diol and hydrogenated bisphenol A.

The epoxy resin can be chain extended for example with any of the aforementioned polyhydric phenols. Preferred chain extenders are bisphenol A and ethoxylated bisphenol A and preferably a combination of these phenols. Also, the polyepoxides can be chain extended with a polyether or a polyester polyol which enhances flow and coalescence. Typical useful chain extenders are polyols such as polycaprolactone diols such as Tone 200® series available from Union Carbide Corporation and ethyoxylated bisphenol A such as SYNFAC 8009® available from Milliken Chemical Company.

Examples of polyether polyols and conditions for chain extension are disclosed in U.S. Pat. No. 4,468,307. Examples of polyester polyols for chain extension are disclosed in Marchetti et al U.S. Pat. No. 4,148,772 issued Apr. 10, 1979.

Typical catalysts that are used in the formation of these polyepoxy hydroxy ether resins are tertiary amines such as dimethyl benzyl amine and organometallic complexes such as triphenyl phosphonium iodide.

Ketimines and/or secondary amines and/or primary amines can be used to cap, i.e., react with the epoxy end groups of the resin to form the epoxy amine adduct. Ketimines are formed by reacting ketones with primary amines. Water formed in the reaction is removed, for example, by azeotropic distillation. Useful ketones include dialkyl, diaryl, and alkylaryl ketones having 3–13 carbon atoms. Specific examples of ketones used to form these ketimines include acetone, methyl ethyl ketone, methyl n-butyl ketone, methyl isobutyl ketone, methyl isoamyl ketone, methyl aryl ketone, ethyl isoamyl ketone, ethyl amyl ketone, acetophenone, and benzophenone. Suitable diamines are ethylene diamine, 1,3-diaminopropane, 1,4-diaminobutane, 1,6-diaminohexane, 4,9-dioxadodecane and 1,12-diamine and the like. One typically useful ketimine is diketimine which is the ketimine of diethylene triamine and methyl isobutyl ketone.

Typically useful primary and secondary amines that can be used to form the epoxy-amine adduct are methyl amine, ethyl amine, propyl amine, butyl amine, isobutyl amine, benzyl amine and the like; and dimethyl amine, diethyl amine, dipropyl amine, diisopropyl amine, dibutyl amine and the like. Alkanol amines are preferred, such as ethanol amine, methanol amine, propanol amine, and the like; and methyl ethanol amine, ethyl ethanol amine, phenyl ethanol amine, diethanol amine and the like. Other amines that can be used are set forth in the aforementioned U.S. Pat. No. 4,419,467 which is hereby incorporated by reference.

The cathodic binder of the electrocoating composition typically contains about 20–80% by weight of the forgoing epoxy amine adduct and correspondingly 80–20% of the blocked isocyanate.

The novel blocked polyisocyanate crosslinking agents which are employed in the coating composition of this invention are organic polyisocyanates that have been pre-reacted with blocking agents which block the isocyanate functionality, i.e., the crosslinking functionality, but which, altogether, do not contribute substantially to weight loss when the film is heated to cure.

The blocked polyisocyanate crosslinking agent of this invention is preferably fully blocked or capped, so that virtually no free isocyanate groups remain and so that the resultant blocked or capped isocyanate is stable to active hydrogens at room temperature but reactive with active hydrogen at elevated temperatures, usually between 90° and 200° C.

The polyisocyanates which are used to form the crosslinking agent are organic polyisocyanates. These can be any suitable aliphatic, cycloapliphatic or aromatic polyisocyanates. Diisocyanates are generally preferred, although higher polyisocyanates, such as triisocyanates can also be used. Examples of suitable aliphatic diisocyanates are straight chain aliphatic diisocyanates such as 1,4-tetramethylene diisocyanate and 1,6-hexamethylene diisocyanate and the like. Also, cycloaliphatic diisocyanates can be employed. Examples include isophorone diisocyanate and 4,4'-methylene-bis-(cyclohexyl isocyanate) and the like. Examples of suitable aromatic diisocyanates are p-phenylene diisocyanate, methylene diphenyl diisocyanate, polymeric methylene diphenyl diisocyanate, and 2,4- or 2,6-toluene diisocyanate and the like. Examples of some higher polyisocyanates such as triisocyanates are methylene triphenyl triisocyanate, 1,3,5-benzene triisocyanate, 2,4,6-toluene triisocyanate and the like. Other higher polyisocyanates such as isocyanate prepolymers can also be used. These are formed from an organic polyisocyanate and a polyol. Any of the aforementioned polyisocyanates can be used with a polyol to form the prepolymer. Polyols such as trimethylol alkanes like trimethylol propane or ethane can be used. Polymeric polyols such as polycaprolactone diols and triols can also be used. Aromatic diisocyanates, such as methylene diphenyl diisocyanate, are generally most preferred.

The blocking agent for the polyisocyanate is one which does not contribute substantially to weight loss, i.e., bake-off loss, when the film is heated to cure. Examples of such materials are hydroxy-functional cyclic carbonate monomers which contain at least one hydroxyl group and at least one cyclic carbonate group per molecule. These monomer compounds can be produced by transesterification of cyclic alkylene carbonates or dialkylene carbonates with polyols in the presence of suitable catalysts. Within the context of the present invention, preferred cyclic carbonate compounds are to be understood as those containing either a five- or six-membered cyclic carbonate group. Typically useful hydroxy-functional cyclic carbonate monomer compounds that can be used to form the blocked isocyanate crosslinking agent have the general formula

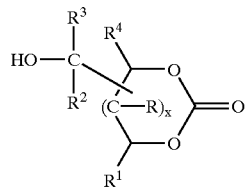

where R, $R^1$, $R^2$, $R^3$ and $R^4$ are each independently selected from H or an alkyl group having 1–12 carbon atoms and x is 0–1. Typically useful 5-membered cyclic carbonate monomers that fall within the above formula are 1,3-dioxolan-2-one-4-propanol (x=0; $R^1$, $R^2$, $R^3$, $R^4$=H), 1,3-dioxolan-2-one-butanol (x=0; $R^1$=$CH_3$, $R^2$, $R^3$, $R^4$=H), 1,3-dioxolan-2-one-pentanol (x=0; $R^1$=$C_2H_5$, $R^2$, $R^3$, $R^4$=H) and the like. Typically useful 6-membered ring cyclic carbonate monomers are (1,3-dioxolan-2-one)-2 methyl, 2 ethyl propanol (x=1; R=$CH_2H_5$; $R^1$, $R^2$, $R^3$, $R^4$=H), (1,3-dioxolan-2-one)-2,2 diethyl propanol (x=1; R=$CH_2H_5$; $R^1$=$CH_3$, $R^2$, $R^3$, $R^4$=H), (1,3 dioxolan-2-one)-2,2 dimethyl propanol (x=1; R=$CH_3$; $R^1$=$CH_3$, $R^2$, $R^3$, $R^4$=H) and the like. A five-membered cyclic carbonate carrying a 1,3-dioxolan-2-one group, such as 1,3-dioxolan-2-one propanol or commonly called glycerin carbonate, is generally preferred.

The blocked polyisocyanates of this invention can be fully blocked with these hydroxy-functional cyclic carbonate monomers as described above, leaving substantially no free isocyanate groups remaining. However, in the present invention, a mixture of blocking agents are generally preferred such that on an average basis, but just one of the isocyanate groups is blocked with the hydroxy-functional cyclic carbonate monomer, and the remaining groups are either blocked with ether alcohols, alkyl alcohols, oximes, amides or any compound with active hydrogen, preferably with a low molecular weight ether or alkyl alcohol which does not contribute substantially to weight loss upon curing. Typical alkyl alcohols are aliphatic, cycloaliphatic or aromatic alkyl monoalcohols having 1–20 carbon atoms in the alkyl group, for example, methanol, ethanol, n-propanol, butanol, 2-ethyl hexanol, cyclohexanol, cyclooctanol, phenol, pyridinol, thiophenol, cresol. Typical ether alcohols are ethylene glycol mono alkyl ether, diethylene glycol mono alkyl ether, propylene glycol mono alkyl ether or dipropylene glycol mono alkyl ether with alkyl group of 1–10 carbon atoms, for example, diethylene glycol mono butyl ether, ethylene glycol butyl ether, diethylene glycol mono methyl ether, ethylene glycol methyl ether, dipropylene glycol mono methyl ether, dipropylene glycol mono butyl ether, propylene glycol mono butyl ether, propylene glycol mono methyl ether. Typical oximes are methyl ethyl ketone oxime, methyl isobutyl ketone oxime, methyl isoamyl ketone oxime, methyl n-amyl ketone oxime, cyclohexanone oxime, diisobutyl ketone oxime. Typical amides are caprolactam, methylacetamide, succinimide, acetanilide. One preferred mixture of blocking agents is glycerin carbonate and propylene glycol mono methyl ether.

The novel blocked polyisocyanate crosslinking agents described above can be, and preferably are, prepared by stepwise or simultaneous reaction of the selected polyisocyanate with a hydroxy-functional cyclic carbonate compound and optional, but preferable, additional blocking agent as described above. This reaction can be effected at elevated temperature in the presence of an inert solvent and suitable catalyst. One preferred class of blocked isocyanates useful as crosslinking agents in the present invention are prepared by slowing charging a mixture of hydroxy-functional cyclic carbonate compound and ether alcohol to polyisocyanate and having the reaction temperature generally kept at 40° C. to 150° C. until all of the isocyanate groups are reacted as indicated by infrared scan. Preferably, the molar ratio of isocyanate to hydroxy-functional cyclic carbonate compound and ether alcohol in the above reaction is in the range of 1:0.05:1 to 1:1:0.05. The preferred reaction is preferably carried in the presence of suitable catalyst such as dibutyl tin dilaurate and also in the presence of inert solvent such as methyl isobutyl ketone.

The cathodic binder of the epoxy amine adduct and the blocked isocyanate are the principal resinous ingredients in the electrocoating composition and are usually present in amounts of about 30 to 50% by weight of solids of the composition. The basic groups (amine groups) of the cathodic binder are partially or totally neutralized with an acid to form a water soluble product. Typical acids used to neutralize the epoxy-amine adduct to form water-dispersible cationic groups are lactic acid, acetic acid, formic acid, sulfamic acid, alkane sulfonic acids such as methane sulfonic acids, ethane sulfonic acid, propane sulfonic acid and the like. Alkane sulfonic acids are generally preferred. The degree of neutralization depends upon the properties of the binder employed in each individual case. In general, sufficient acid is added to provide the resulting electrocoating composition with a pH of about 5.5–8.0. To form an electrocoating bath, the solids of the electrocoating composition are generally reduced with an aqueous medium to the desired bath solids.

Besides the binder resin ingredients described above, the electrocoating composition usually contains pigment which is incorporated into the composition in the form of a pigment paste. The pigment paste is prepared by grinding or dispersing a pigment into a grinding vehicle with curing catalyst and other optional ingredients such as anticratering agents wetting agents, surfactants, and defoamers. Any of the pigment grinding vehicles that are well known in the art can be used. Typically, grinding is done using conventional equipment known in the art such as an Eiger mill Dynomill or sand mill. After grinding, the particle size of the pigment should be as small as practical, generally, the particle size is about 6–8 using a Hegman grinding gauge.

Viscosity of the pigment dispersion before it is ground or milled is important. B Brookfield viscosity typically is used determined in accordance with ASTM D-2196. While the desired viscosity will vary with the selected components, viscosity generally will be in the range of 8000 centipoise to 1500 centipoise (0.8 Pa.s to 115 Pa.s) to achieve a fine grind during grinding. Viscosity typically increases during grinding and is readily adjusted by modifying the amount of water present.

Pigments which can be used in this invention include titanium dioxide, basic lead silicate, strontium chromate, carbon black, iron oxide, clay and the like. Pigments with high surface areas and oil absorbencies should be used judiciously because these can have an undesirable affect on coalescence and flow of the electrodeposited coating.

The pigment to binder weight ratio is also important and should be preferably less than 0.5:1, more preferably less than 0.4:1, and usually about 0.2 to 0.4:1. Higher pigment to binder weight ratios have been found to adversely affect coalescence and flow.

The electrocoating compositions of the invention can contain optional ingredients such as wetting agents, surfactants, defoamers and the like. Examples of surfactants and wetting agents include alkyl imidazolines such as those available from Ciba-Geigy Industrial Chemicals as Amine C®, acetylenic alcohols available from Air Products and Chemicals as Surfynol 104®. These optional ingredients, when present, constitute from about 0.1 to 20 percent by weight of binder solids of the composition.

Optionally, plasticizers can be used to promote flow. Examples of useful plasticizers are high boiling water immiscible materials such as ethylene or propylene oxide adducts of nonyl phenols or bisphenol A. Plasticizers are usually used at levels of about 0.1 to 15 percent by weight resin solids.

Curing catalyst such as tin are usually present in the composition. Examples are dibutyltin dilaurate and dibutyltin oxide. When used, they are typically present in amounts of about 0.05 to 1 percent by weight tin based on the weight of total resin solids.

The electrocoating composition of this invention are dispersed in an aqueous medium. The term "dispersion" as used within the context of this invention is believed to be a two-phase translucent or opaque aqueous resinous binder system in which the binder is in the dispersed phase and water the continuous phase. The average particle size diameter of the binder phase is about 0.1 to 10 microns, preferably, less than 5 microns. The concentrations of the binder in the aqueous medium in general is not critical, but ordinarily the major portion of the aqueous dispersion is water. The aqueous dispersion usually contains from about 3 to 50 percent preferably 5 to 40 percent by weight binder solids. Aqueous binder concentrates which are to be further diluted with water when added to an electrocoating bath, generally have a range of binder solids of 10 to 30 percent weight.

Besides water, the aqueous medium of the cathodic electrocoating composition contains a coalescing solvent. Useful coalescing solvents include hydrocarbons, alcohols, polyols, and ketones. Preferred coalescing solvents include monobutyl and monohexyl ethers of ethylene glycol and phenyl ether of propylene glycol. The amount of coalescing solvent is not critical but generally is between 0.1 to 15% by weight, preferably 0.5% by weight, based on the total weight of the aqueous medium.

The electrocoating composition of this invention is used in a conventional cathodic electrocoating process. The electrocoating tank contains two electrically conductive electrodes; the anode which is part of the electrocoating tank and the cathode which is the object that is to be coated such as an auto body or auto part. An adherent film is deposited on the cathode when a sufficient voltage is impressed between the two electrodes. The voltages that are applied may be varied depending on the type of coating and on coating thickness and throw power required and may be as low as 1 volt or as high as several thousand volts. Typical voltages used are between 50–500 volts. The current density usually is between 0.5 and 5 amperes per square foot and decreases during electrodeposition indicating that an insulating film is being deposited. The immersion time should be sufficient to obtain a cured coating of about 0.5–1.5 mils, preferably 0.8–1.2 mils. A variety of substrates can be electrocoated with the composition of this invention such as steel, phosphatized steel, galvanized steel, copper, aluminum, magnesium and various plastics coated with an electrically conductive coating.

After the coating has been electrocoated, it is cured by baking at elevated temperatures such as 90–260° C. for a sufficient time to cure the coating, typically about 5 to 30 minutes.

The following example illustrates the invention. All parts and percentages are on a weight basis unless otherwise indicated.

EXAMPLES

The following blocked polyisocyanates were prepared, one in accordance with the invention and the other using conventional blocking agents, and then principal emulsions and electrocoating compositions were prepared therefrom and the properties of these compositions were compared.

Example 1
Glycerin Carbonate/Ether Alcohol Blocked Polyisocyanate Crosslinking Resin Solution A glycerin carbonate/ether alcohol blocked polyisocyanate crosslinking resin solution was prepared by charging 381.66 parts Mondur® MR (methylene diphenyl diisocyanate), 127.22 parts methyl isobutyl ketone and 0.11 parts dibutyl tin dilaurate into a suitable reaction vessel equipped with a nitrogen inlet, a strirrer, and a heating source and heated to 37° C. under a dry nitrogen blanket. A mixture of 187.94 parts glycerin carbonate (structure below) and 130.29 parts propylene glycol mono methyl ether was slowly charged into the reaction vessel while maintaining the reaction mixture below 93° C. The resulting mixture was held at 110° C. until all of the isocyanate was reacted as indicated by infrared scan. 7 parts butanol and 165.77 parts methyl isobutyl ketone were added to the reaction mixture. The resulting resin solution had a nonvolatile content of 70%.

Glycerin Carbonate (x=0; $R^1$, $R^2$, $R^3$, $R^4$=H)

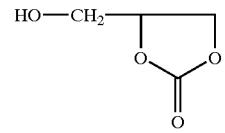

Example 2
Conventional Ether Alcohol Blocked Polyisocyanate Crosslinking Resin Solution A standard alcohol blocked polyisocyanate crosslinking resin solution was prepared by charging 317.14 parts Mondur® MR (methylene diphenyl diisocyanate), 105.71 parts methyl isobutyl ketone and 0.06 parts dibutyl tin dilaurate into a suitable reaction vessel equipped as above and heated to 37° C. under a nitrogen blanket. A mixture of 189.20 parts propylene glycol mono methyl ether and 13.24 parts trimetylolpropane was slowly charged into the reaction vessel while maintaining the reaction mixture below 93° C. The reaction mixture was then held at 110 C. until essentially all of the isocyanate was reacted as indicated by infrared scan. 3.17 parts butanol and 64.33 parts methyl isobutyl ketone were then added. The resulting resin solution had a nonvolatile content of 75%.

Example 3
Chain Extended Polyepoxide Resin Emulsion with Glycerin Carbonate Blocked Polyisocyanate Resin Solution A polyepoxide resin solution was prepared by charging the following ingredients into a suitable reaction vessel equipped as above: 512 parts Epon®828 (Epoxy resin of diglycidyl ether of bisphenol A having an epoxy equivalent weight of 188), 302 parts bisphenol A, 380 parts ethoxylated bisphenol A having a hydroxyl equivalent weight of 247 (Synfac®8009), 89 parts xylene and 1 part dimethyl benzyl amine. The resulting reaction mixture was heated to 160° C. under nitrogen blanket and held at this temperature for one hour. 2 parts dimethyl benzyl amine were added and the mixture was held at 147° C. until an epoxy equivalent weight of 1050 was obtained. The reaction mixture was cooled to 149° C. and then 848 parts glycerin carbonate blocked polyisocyanate resin solution (prepared in Example 1) was added. At 107° C., 290 parts diketimine (reaction product of diethylenetriamine and methyl isobutyl ketone at 73% nonvolatile) and 59 parts of methyl ethanol amine were added. The resulting mixture was held at 120° C. for one hour and then dispersed in an aqueous medium of 1213 parts deionized water and 126 parts lactic acid (88% lactic acid in deionized water). It was further diluted with 818 parts deionized water. The emulsion was kept agitated until methyl isobutyl ketone had evaporated. The resulting emulsion had a nonvolatile content of 38%.

Example 4
Chain Extended Polyepoxide Resin Emulsion with Conventional Crosslinking Resin Solution A polyepoxide resin solution was prepared by charging the following ingredients into a suitable reaction vessel equipped as above: 520 parts Epon®828 (Epoxy resin of diglycidyl ether of bisphenol A having an epoxy equivalent weight of 188), 151 parts bisphenol A, 190 parts ethoxylated bisphenol A having a hydroxyl equivalent weight of 247 (Synfac®8009), 44 parts xylene and 1 part dimethyl benzyl amine. The resulting reaction mixture was heated to 160° C. under nitrogen blanket and held at this temperature for one hour. 2 parts dimethyl benzyl amine were added and the mixture was held at 147° C. until an epoxy equivalent weight of 1050 was obtained. The reaction mixture was cooled to 149° C. and then 797 parts conventional crosslinking resin solution (prepared in Example 2) was added. At 107° C., 58 parts of diketimine (reaction product of diethylenetriamine and methyl isobutyl ketone at 73% nonvolatile) and 48 parts of methyl ethanol amine were added. The resulting mixture was held at 120° C. for one hour and then dispersed in an aqueous medium of 1335 parts deionized water and 61 parts lactic acid (88% lactic acid in deionized water). It is further diluted with 825 parts deionized water. The emulsion was kept agitated until methyl isobutyl ketone had evaporated. The resulting emulsion had a nonvolatile content of 38%.

Example 5
Quaternizing Agent

The quaternizing agent was prepared under a nitrogen blanket by adding 87 parts dimethylethanolamine to 320 parts 2-ethyl hexanol half-capped toluene duisocyanate (PPG Industries) to a reaction vessel at room temperature. An exothermic reaction occurred and the reaction mixture was stirred for one hour at 80° C. 118 parts aqueous lactic acid solution (75% nonvolatile content) was then added followed by the addition of 39 parts 2-butoxyethanol. The reaction mixture was held for about one hour at 65° C. with constant stirring to form the quaternizing agent.

Example 6
Pigment Grinding Vehicle

The pigment grinding vehicle was prepared by charging 710 parts Epon® 828 (Diglycidyl ether of bisphenol A having an epoxide equivalent weight of 188) and 290 parts bisphenol A into a suitably equipped reaction vessel under nitrogen blanket and heated to 150° C.–160° C. to initiate an exothermic reaction. The exothermic reaction was continued for about one hour at 150° C.–160° C. The reaction mixture was then cooled to 120° C. and 496 parts of 2-ethyl hexanol half-capped toluene diisocyanate was added. The temperature of the reaction mixture was held at 110° C.–120° C. for one hour, followed by the addition of 1095 parts of 2-butoxyethanol, the reaction mixture was then cooled to 85° C.–90° C. and then 71 parts of deionized water was added followed by the addition of 496 parts quaternizing agent (prepared in Example 5). The temperature of the reaction mixture was held at 85° C.–90° C. until an acid value of about 1 was obtained.

Example 7
Pigment Paste

A pigment paste was prepared by charging the following constituents into a suitable mixing container and mixing until a homogeneous mixture was formed and then charging the resulting mixture into an Eiger mill and grinding until a Hegman reading of 7 or greater was reached.

|  | Parts by Weight |
|---|---|
| Pigment grinding vehicle (prepared in Example 6) | 597.29 |
| Deionized water | 1140.97 |
| Titanium dioxide pigment | 835.66 |
| Aluminum silicate pigment | 246.81 |
| Carbon black pigment | 15.27 |
| Dibutyl tin oxide | 164.00 |
|  | 3000.00 |

Example 8

Preparation of Electrocoating Baths I–II

|  | Parts by weight | |
|---|---|---|
|  | Bath I | Bath II |
| Emulsion (prepared in Example 3) | 1503.08 | — |
| Emulsion (prepared in Example 4) | — | 1503.08 |
| Deionized water | 2013.49 | 2013.49 |
| Pigment paste (prepared in Example 7) | 397.54 | 397.54 |
| Conventional anti crater agent* | 85.89 | 85.89 |
| Total | 4000.00 | 4000.00 |

*Conventional anti crater agent is the reaction product of Jeffamine ® D2000 and Epon ® 1001 epoxy resin.

Cationic Electrocoating Baths I–II were prepared by mixing the above ingredients. Each bath was then ultrafilterd. Phosphated cold rolled steel panels were electrocoated in each bath at 240–280 volts to obtain a film 0.8–0.9 mils (20.3–25.4 microns) thick on each panel. The electrocoated panels were then baked at 360° F. metal temperature for 10 minutes. For solvent resistance test, the electrocoated panels were instead baked at 330° F. metal temperature for 10 minutes.

The above prepared panel were tested for surface roughness using a Taylor-Hobson Surtronic 3+ profilometer, solvent resistance by a standard rub test (20 double rubs with methyl ethyl ketone soaked rag), edge corrosion, and for bake-off loss. The results of these tests are as follows:

| Results | | |
|---|---|---|
| Properties | Bath I | Bath II |
| Surface Roughness | 8 μin | 13 μin |
| Solvent Resistance | No Rub Off (Good Cure) | Dull Appearance (Poor Cure) |
| Bake Off Loss at 360° F. 10 Min.* | 8% | 12% |
| Edge corrosion (No. of rust spots)** | 60–80 | 120–140 |

*To determine the percentage bake-off loss during baking, the first step is to deposit the e-coat film on pre-weighed metal panels, the residual water is removed by heating the panels at 105° C. for 3 hours and finally the panels are baked at the specified time and temperature. The percentage bake-off loss of e-coat film is then determined by the difference of the weight of e-coat before and after baking divided by the initial weight.
**To measure edge corrosion resistance, razor blades were electrocoated in bath I and II and baked at 360° F. for 10 minutes metal temperature. The razor blades were then exposed to salt spray for 7 days. The number of rust spots on each blade were counted by viewing the blades under microscope.

The above results show that Bath I containing the glycerin carbonate blocked polyisocyanate crosslinking agent had better surface smoothness, better edge corrosion, superior crosslinking and better bake-off loss than Bath II containing conventional crosslinking agents.

What is claimed is:

1. An improved aqueous cathodic electrocoating composition comprising a binder of an epoxy-amine adduct, a blocked polyisocyanate crosslinking agent and an organic or inorganic acid as a neutralizing agent for the epoxy-amine adduct; wherein the improvement is the incorporation of a blocked polyisocyanate crosslinking agent that has at least one isocyanate group blocked with a hydroxy-functional cyclic carbonate compound.

2. The improved electrocoating composition of claim 1 in which the blocked polyisocyanate crosslinking agent is fully blocked with a hydroxy-functional cyclic carbonate compound.

3. The improved electrocoating composition of claim 1 in which the blocked polyisocyanate has on en average basis only one of the at least one isocyanate group blocked with the hydroxy-functional cyclic carbonate compound.

4. The improved electrocoating composition of claim 3 in which the remaining isocyanate groups are blocked with saturated alkyl alcohols, ether alcohols, oximes or amides.

5. The improved electrocoating composition of claim 1 in which the blocked polyisocyanate crosslinking agent is blocked with a mixture of blocking agents including the hydroxy functional cyclic carbonate compound, and at least one other blocking agent selected from the group consisting of saturated alkyl alcohols, ether alcohols, oximes and amides.

6. The improved electrocoating composition of claim 1 in which the epoxy-amine adduct contains amines selected from the group consisting of primary amines, secondary amines and ketimines and mixtures thereof.

7. The improved electrocoating composition of claim 1 in which the hydroxy functional cyclic carbonate blocking agent has the general formula

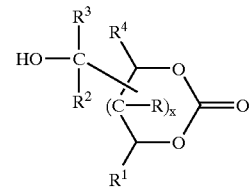

where R, $R^1$, $R^2$, $R^3$ and $R^4$ are each independently selected from the group consisting of H and an alkyl group having 1–12 carbon atoms and x is 0–1.

8. The improved electrocoating composition of claim 1 in which the hydroxy functional cyclic carbonate blocking agent is glycerin carbonate.

9. The improved electrocoating composition of claim 1 in which the epoxy-amine adduct comprises a polyepoxy hydroxy ether resin extended with a dihydric phenol and reacted with an amine and is neutralized with the organic or inorganic acid.

10. An improved method of preparing a cathodic electrocoating composition comprising the following steps in any workable order:

preparing an epoxy amine adduct of an epoxy resin extended with a dihydric phenol and reacted with an amine;

preparing a blocked polyisocyanate crosslinking agent;

blending the epoxy amine adduct with the blocked polyisocyanate crosslinking agent;

neutralizing the epoxy amine adduct with an organic or inorganic acid to form a neutralized emulsion;

forming a pigment dispersion and blending the pigment dispersion with the neutralized emulsion;

wherein the improvement consist of using in step (b) a blocked polyisocyanate crosslinking agent having at least one isocyanate group blocked with a hydroxy functional cyclic carbonate compound.

* * * * *

UNITED STATES PATENT AND TRADEMARK OFFICE
CERTIFICATE OF CORRECTION

PATENT NO. : 6,607,646 B2
DATED : August 19, 2003
INVENTOR(S) : Gam Allisa

It is certified that error appears in the above-identified patent and that said Letters Patent is hereby corrected as shown below:

Column 11,
Line 38, "en" should be -- an --.

Signed and Sealed this

Twentieth Day of July, 2004

JON W. DUDAS
*Acting Director of the United States Patent and Trademark Office*